Oct. 6, 1953  E. L. FAUST  2,654,509
HOPPER CONNECTING MEANS FOR DISTRIBUTING MECHANISMS
Filed Sept. 30, 1948  2 Sheets-Sheet 1
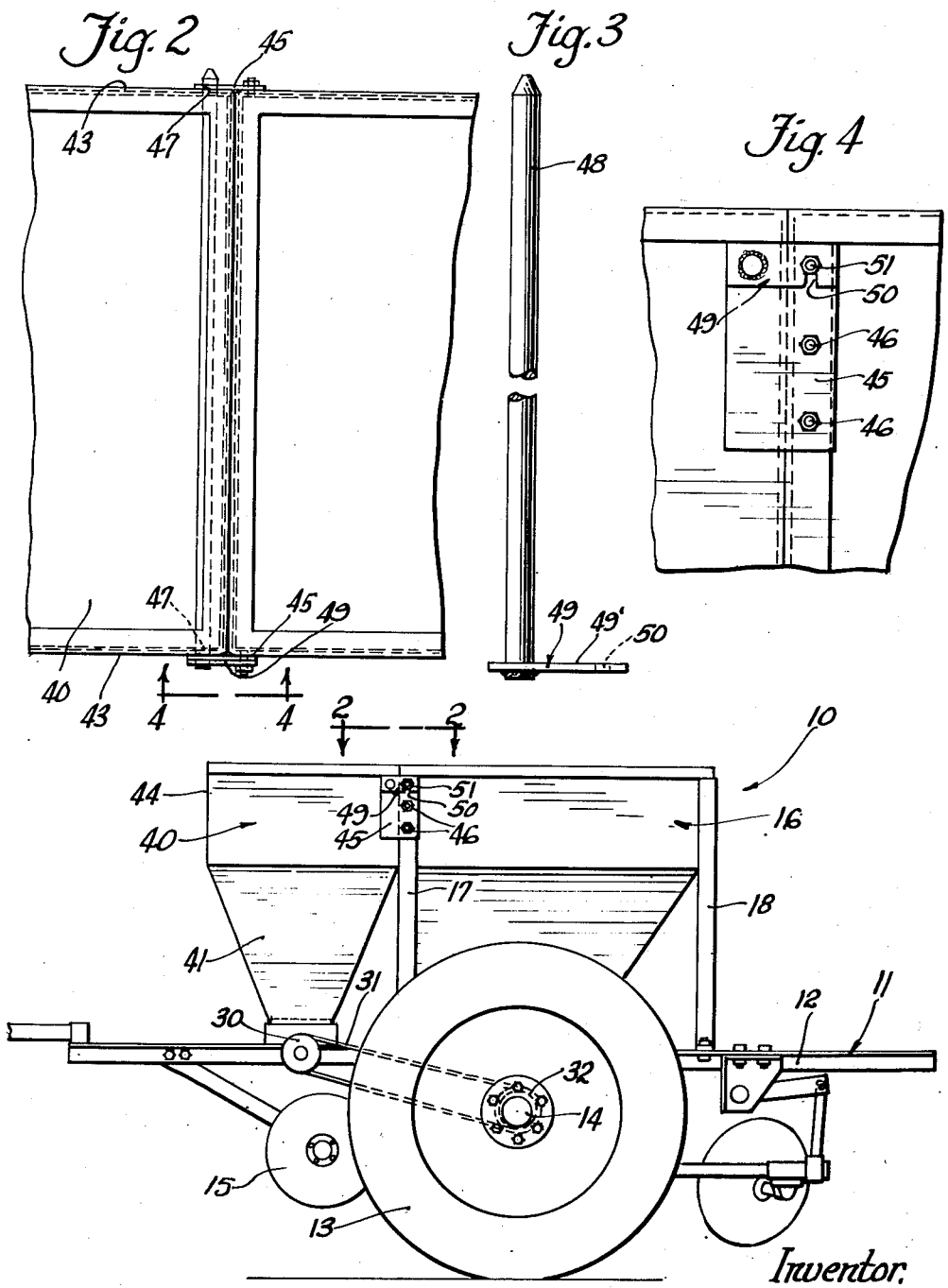
Inventor:
Ellwood L. Faust
By Paul O. Pippel
Att'y

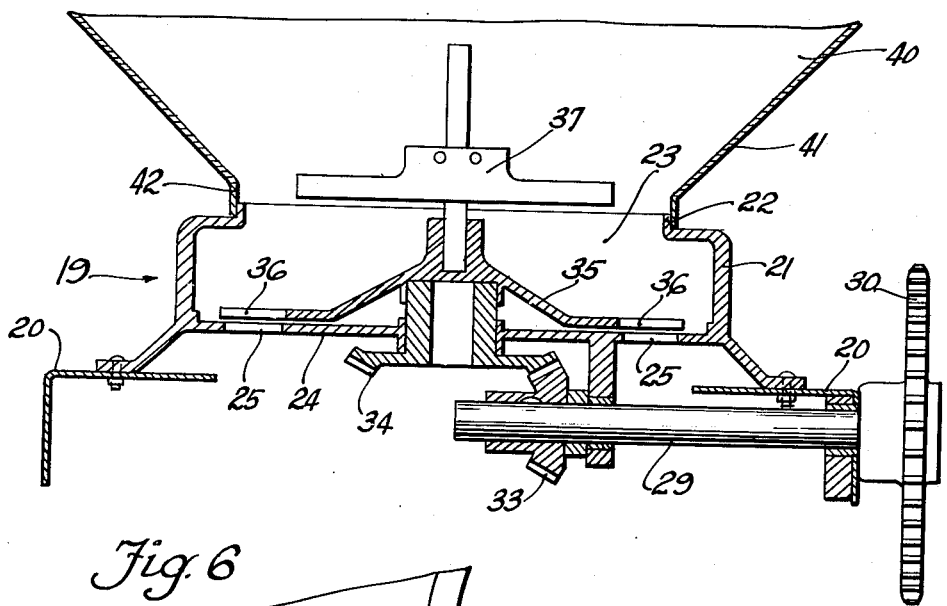
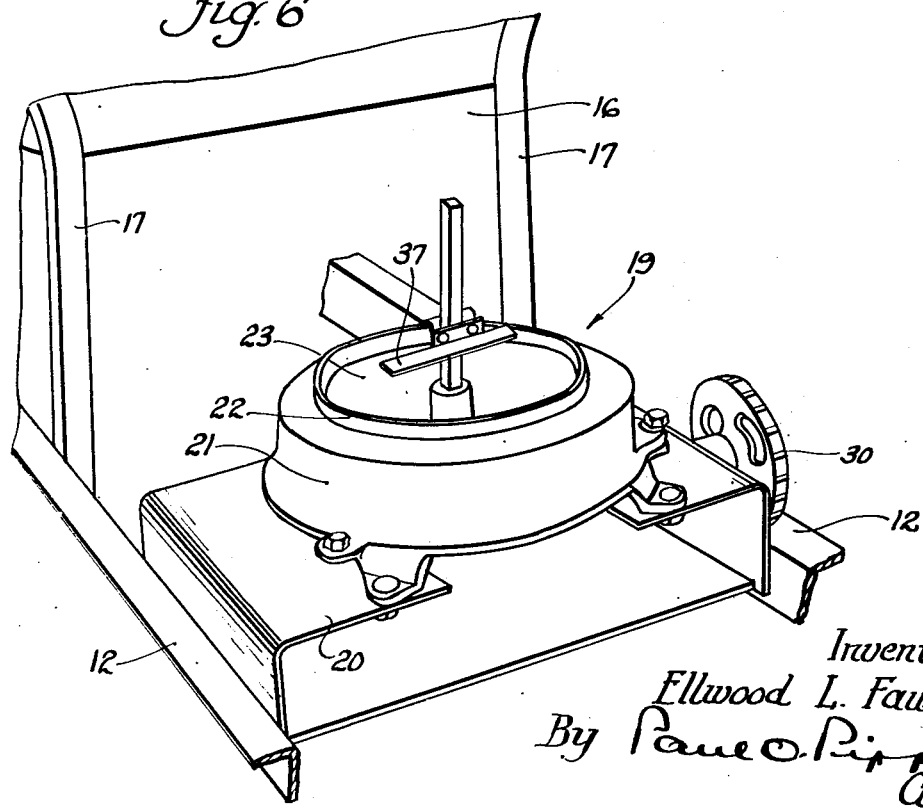

Patented Oct. 6, 1953

2,654,509

UNITED STATES PATENT OFFICE 2,654,509

HOPPER CONNECTING MEANS FOR DISTRIBUTING MECHANISMS

Ellwood L. Faust, Elmhurst, Ill., assignor to International Harvester Company, a corporation of New Jersey Application September 30, 1948, Serial No. 51,928

6 Claims. (Cl. 222—135)

This invention relates to a distributing mechanism and particularly to an implement of a type known as a planter. More specifically this invention relates to a potato planter having a material receiving hopper and an improved connection for removably securing the hopper to the frame of the planter.

Distributing implements of the planter type generally consist of a frame on which a number of material hoppers are positioned. A potato hopper and fertilizer hopper are generally mounted on a movable frame which trails behind a tractor or other movable power means. The hoppers are generally provided with conventional type distributing mechanisms. The potato hopper dispenses segments of potato by means of a pick mechanism which drops the segments into previously opened furrows. The fertilizer hopper is arranged so that fertilizer may be distributed to the furrows before the potato segments have been dropped. Under certain conditions the fertilizer distributing mechanism may become clogged or the chain mechanism which normally operates the potato distributing and fertilizer distributing mechanism may need adjustment or replacement. Under conditions of this sort it is desirable to have a quick attachable and detachable connection for securing the fertilizer hopper to the planter frame so that the same may be readily removed in the field. At the same time it is also desirable that the hopper be positioned on the frame in a secure and positive manner so that a rigid supporting structure is provided. It is the prime object of applicant's invention to provide a quick removable and attachable hopper construction for a distributing mechanism.

It is another object to provide a quick attachable and detachable securing means for the material receiving structure of a distributing mechanism, said means being effective to rigidly secure the material receiving means on the frame of the implement.

Another object is to provide a novel locking connection for removably securing a material hopper on a distributing frame structure.

These and other objects will become more readily apparent upon a reading of the specification when examined in connection with the drawings.

In the drawings:

Fig. 1 is a side elevational view of a distributing mechanism such as a planter.

Fig. 2 is a view taken substantially along the line 2—2 of Fig. 1.

Fig. 3 is a detail plan view of a connecting rod.

Fig. 4 is a fragmentary view taken along the line 4—4 of Fig. 2.

Fig. 5 is a cross-sectional view through a distributing mechanism showing a portion of a material receiving hopper.

Fig. 6 is a perspective view of the distributing mechanism.

Referring particularly to Figs. 1, 5, and 6, a planter or distributing means is generally designated by the reference character 10. The distributing means 10 includes a longitudinally extending frame structure 11 consisting of a pair of laterally spaced angle members 12. The frame is supported on ground wheels 13, only one of which is shown. The ground wheels are rotatable upon an axle 14. The forward portion of the frame 11 is provided with a furrow opener 15 of conventional construction.

A potato hopper 16 is positioned rigidly on the frame 11 by means of supports 17 and 18. The potato hopper 16 is in communication with a potato distributing mechanism of a pick type (not shown), this construction being well known to those acquainted with the art.

A distributing mechanism is generally designated by the reference character 19, as best shown in Figs. 5 and 6. The distributing mechanism is securely mounted on the angle members 12 by means of brackets 20. The distributing mechanism 19 includes a casing 21 which extends upwardly and is provided with an upwardly extending annular flange 22. The flange 22 defines a feed throat 23 which is adapted to receive fertilizing material. The casing 21 also includes a bottom wall 24, as best shown in Fig. 5. The bottom wall 24 is provided with a plurality of distributing openings 25. A transversely extending shaft 29 is journaled on the casing 21. The shaft 29 is provided at one end with a driving sprocket 30 that is rotated by means of a chain 31 from a sprocket 32. The sprocket 32, as best shown in Fig. 1, is driven by means of one of the wheels 13. A bevel gear 33 is positioned at one end of the shaft 29. The bevel gear 33 is in driving engagement with a gear 34 which is journaled in the bottom wall 24. The gear 34 is connected to drive a dispensing plate 35. The dispensing plate 35 is rotatable and includes distributing fingers 36 for normally delivering fertilizer material within the casing to the openings 25. An agitator 37 is connected for rotation to the dispensing plate 35. A hopper or fertilizer receiving tank 40 is positioned on the frame 11.

The hopper 40 includes a narrow annular discharge portion 41 at its lower end, as best shown in Figs. 1 and 5. The discharge portion 41 is provided with an annular flange 42 which is in receiving or telescoping engagement with the upwardly extending annular flange 22 of the casing 21. The hopper 40 consists of side walls 43 and end walls 44. Means for securing the hopper 40 to the distributing mechanism 19 are provided in the form of a pair of plates 45, as best shown in Figs. 2 and 4. The plates 45 are positioned in transverse relation to the sides of the potato hopper 16 by means of bolts 46. The plates 45 extend outwardly with respect to the hopper 16 and are in overlapping relation with respect to the hopper 40. The plates 45 are also provided with horizontally aligned openings 47.

As best shown in Figs. 2 and 3, a connecting rod 48 is provided with a lock member 49 at one end. The lock member 49 consists of a metal plate 49' which extends perpendicularly with respect to the rod 48. The metal plate 49' is provided with an open end slot 50 at one end and is securely welded at the other end to the rod 48. The slot 50 may be engaged by an adjustable or connecting member 51 as best shown in Fig. 4.

Ae best shown in Fig. 2, the rod 48 extends through the openings 47 of the plates 45. The rod also extends through the sides 43 of the hopper 40, thus rigidly securing the hopper 40 against vertical or longitudinal displacement.

The plates 45 overlap the sides 43 of the hopper 40 so that the hopper is also secured rigidly against lateral displacement. The lock member 49 has the open end slot in connecting engagement with the adjustable or connecting member 51. Since the annular flange 42 of the discharge end 41 of the hopper 40 is in overlapping telescoping engagement with the flange 22 of the casing 21 and in view of the novel connection of the hopper by means of the rod 48 an effective and positive locking arrangement is provided so that the hopper is rigidly secured to the frame 11 of the planter. When, however, it is desired to remove the hopper in the field, it can readily be done by simply rotating the rod 48 in the openings 47 thereby in turn rotating the lock member 49 in counter-clockwise relation whereupon the slot 50 will be moved out of engagement with the adjustable member 51. The adjustable member 51 as shown in Fig. 1, may be in the form of a lock or bolt that can be quickly unloosened so that the lock member may be rotated. After the lock member 49 has thus been disengaged the rod 48 may readily be withdrawn from the hopper and the hopper may thereupon be quickly removed. It can thus be seen that a novel, quick detachable and attachable construction has been provided that will permit the operator to remove the hopper whenever clogging or repair of the distributing mechanism is necessary. The access to the working parts of the planter and distributing parts of the mechanism are thus facilitated.

It must be understood that changes and modifications may be made which do not depart from the spirit of the invention as disclosed nor from the scope thereof as defined in the appended claims.

What is claimed is:

1. In a mobile planter having a frame; a first material receiving hopper mounted on said frame; a distributing mechanism positioned on said frame adjacent said receiving hopper, said distributing mechanism including a casing having an upwardly extending annular flange defining a receiving throat; a second material receiving hopper, said hopper including a relatively narrow discharge portion; and means for detachably supporting said second hopper on said frame including a pair of plates rigidly secured to the sides of said first hopper, said plates projecting outwardly of the first hopper and overlapping sides of the second hopper, each of said plates including an opening spaced outwardly from the first hopper, the openings of said plates being in horizontal alignment, a connecting rod extending through the sides of said second hopper and through said openings, a lock member connected to one end of said rod, said lock member extending substantially parallel with and overlapping a portion of the sides of said first hopper, said lock member being provided with an open end slot, said discharge portion of said second hopper engaging said material receiving throat in overlapping telescoping relation, and an adjustable member on said first hopper engageable with said slot, said lock member being rotatable out of engagement with said adjustable member whereby said rod may be withdrawn from said second hopper and said discharge portion may be disengaged from said material receiving throat and said second hopper may be removed from said frame.

2. In a mobile planter having a frame; a first upright material receiving hopper mounted on said frame; a distributing mechanism positioned on said frame adjacent said receiving hopper, said distributing mechanism including a casing having a flange defining a receiving throat; a second material receiving hopper, said hopper including a discharge portion; and means for detachably supporting said second hopper on said frame including a pair of plates rigidly secured to said first hopper, said plates projecting outwardly of said first hopper, a connecting rod extending transversely through the plates and engaging portions of said second hopper, a lock member connected to one end of said rod, said lock member being provided with an open end slot, said discharge portion of said second hopper engaging said material receiving throat in overlapping telescoping relation, and a fastener member on said first hopper engageable with said slot, said lock member being rotatable out of engagement with said fastener whereby said rod may be withdrawn from said second hopper and said discharge portion may be disengaged from said material receiving throat and said second hopper may be removed from said frame.

3. In a mobile distributing unit having a frame; a dispensing mechanism including an upwardly extending material receiving throat; a pair of transversely spaced upwardly extending support members rigidly connected to said frame; a material supply structure comprising a hopper having a discharge portion; and means for detachably supporting said hopper on said frame including a plate connected to each support member, said plates projecting outwardly from said support members and overlapping sides of the hopper, a rod rotatably supported on said plates, said rod extending transversely through sides of the hopper, a lock member on one end of said rod, said member having an open end slot, said discharge portion of said hopper engaging said material receiving throat in overlapping telescoping relation, and an adjustable member on said support engageable with said slot for securing said rod in engagement with said hopper, said rod being rotatable whereby said lock member and said adjustable member are disengaged and said rod may be withdrawn from said hopper and said discharge portion may be disengaged from said material receiving throat.

4. In a distributing unit having a frame; a distributing mechanism including a material receiving throat, and upwardly extending support members rigidly attached to said frame; a material supply structure comprising a hopper having a discharge portion; and means for detachably supporting said hopper on said frame including plates rigidly secured to said support members, a connecting rod rotatably supported on said plates, said rod extending transversely through sides of said hopper, a lock member on one end of said rod, said member having an open end slot, said discharge portion of said hopper engaging said material receiving throat in overlapping telescoping relation, and an adjustable member on one of said support members engageable with said slot for securing said rod in engagement with said hopper, said rod being rotatable whereby said lock member and said adjustable member are disengaged and said rod may be withdrawn from said hopper and said hopper may be disengaged from said material receiving throat and removed from said frame.

5. The combination of a support having an annular flange and a receptacle, and means for detachably supporting said receptacle on said support including a pair of transversely spaced plates rigidly secured to said support, a connecting rod extending through the plates and engaging portions of said receptacle, a lock member connected to one end of said rod, said lock member being provided with an open end slot, said receptacle having a portion engaging said annular flange in overlapping telescoping relation, and a fastener member on said support engageable with said slot for securing said rod in engagement with said receptacle, said lock member being rotatable with respect to said fastener member to disengage said slot from said fastener member to allow withdrawal of said rod from said receptacle and disengagement of said receptacle from said annular flange and removal from said support.

6. The combination of a supporting structure and a receptacle, and quick attachable means for securing the receptacle to the supporting structure, comprising a pair of plates connected at transversely spaced points to said supporting structure, a rod supported on said plates, said rod extending transversely through portions of said receptacle, and a lock member on one end of said rod, said member having an open end slot, and connecting means on said supporting structure engageable with said open end slot for securing said rod in engagement with said receptacle, said rod being movable to disengage said open end slot of said lock member from said connecting means and allow withdrawal of said rod from said receptacle.

ELLWOOD L. FAUST.

References Cited in the file of this patent

UNITED STATES PATENTS

| Number | Name | Date |
|---|---|---|
| 184,890 | Newman | Nov. 28, 1876 |
| 351,848 | Brown | Nov. 2, 1886 |
| 646,089 | Eral | Mar. 27, 1900 |
| 694,285 | Joyner et al. | Feb. 25, 1902 |
| 710,011 | Rohmer | Sept. 30, 1902 |
| 1,038,842 | Buck | Sept. 17, 1912 |
| 1,270,577 | Williams | June 25, 1918 |
| 1,356,062 | Gorsline | Oct. 19, 1920 |
| 2,032,257 | Carmichael | Feb. 25, 1936 |
| 2,124,198 | Kriegbaum et al. | July 19, 1938 |
| 2,303,876 | Gaddis | Dec. 1, 1942 |

FOREIGN PATENTS

| Number | Country | Date |
|---|---|---|
| 609 | Great Britain | Apr. 21, 1910 |
| 274,088 | Italy | May 10, 1930 |
| 337,624 | Germany | June 4, 1921 |
| 513,612 | Great Britain | Oct. 17, 1939 |